(12) United States Patent
Gee et al.

(10) Patent No.: US 12,146,774 B2
(45) Date of Patent: Nov. 19, 2024

(54) APPARATUS AND METHOD FOR MEASURING FLOW-PERMEABLE SURFACE AREA OF POROUS POWDERS USING VOLUME FLOW RATE

(71) Applicant: Lawrence Livermore National Security, LLC, Livermore, CA (US)

(72) Inventors: Richard H. Gee, Livermore, CA (US); Amitesh Maiti, San Ramon, CA (US); Henry E. Reinstein, Livermore, CA (US); Alexander David Wilson, Danville, CA (US); Peter J. Zischka, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 117 days.

(21) Appl. No.: 17/017,271

(22) Filed: Sep. 10, 2020

(65) Prior Publication Data

US 2022/0074766 A1    Mar. 10, 2022

(51) Int. Cl.
*G01F 1/36*    (2006.01)
*G01F 1/88*    (2006.01)
(Continued)

(52) U.S. Cl.
CPC .............. *G01F 1/363* (2013.01); *G01F 1/88* (2013.01); *G01N 15/02* (2013.01); *G01N 15/082* (2013.01); *G06F 17/11* (2013.01)

(58) Field of Classification Search
None
See application file for complete search history.

(56) References Cited

U.S. PATENT DOCUMENTS 2,392,636 A * 1/1946 Boehler ............. G01N 15/0826
    73/38
3,457,791 A * 7/1969 Johnson ............. G01N 15/088
    73/865.5

(Continued)

OTHER PUBLICATIONS

Dubrow et al., "Determination of Specific Surface fo Sieve-Size Powders," Feb. 1955, Pyrotechnics Chemical Research Lab., downloaded from https://pubs.acs.org/doi/pdf/10.1021/ac60098a040, on Jul. 27, 2022 (Year: 1955).*

(Continued)

*Primary Examiner* — Michael J Dalbo
*Assistant Examiner* — Denise R Karavias
(74) *Attorney, Agent, or Firm* — HARNESS, DICKEY & PIERCE, P.L.C.

(57) ABSTRACT

A system for determining particle size of a quantity of a sample material contained in a sample material holder is disclosed, where the sample material is made up a plurality of the particles. The system may incorporate a pressure regulating subsystem for receiving a first pressurized airflow signal and regulating the first pressurized airflow signal to a second pressurized airflow signal having a pressure lower than the first pressurized airflow signal, the second pressurized airflow signal configured to be input to a first end of the sample material holder. A mass airflow transducer may be incorporated for determining a flow rate representing an air flow value entering the sample material holder. A control module uses the air flow value in combination with the pressure differential value and mathematically determining a dimension of the particles making up the sample material.

17 Claims, 5 Drawing Sheets

(51) Int. Cl.
    *G01N 15/02*     (2024.01)
    *G01N 15/08*     (2006.01)
    *G06F 17/11*     (2006.01)

(56) References Cited

U.S. PATENT DOCUMENTS

| | | | | | |
|---|---|---|---|---|---|
| 4,864,845 | A | * | 9/1989 | Chandler | G01N 15/0826 |
| | | | | | 73/152.41 |
| 6,845,651 | B2 | * | 1/2005 | Gupta | G01N 15/0893 |
| | | | | | 73/38 |
| 6,874,404 | B1 | * | 4/2005 | Elberson | B05B 7/2491 |
| | | | | | 91/435 |
| 2004/0134258 | A1 | * | 7/2004 | Wang | G01N 7/04 |
| | | | | | 73/865.5 |
| 2006/0108003 | A1 | * | 5/2006 | Bradford | G05D 7/0635 |
| | | | | | 73/204.25 |
| 2015/0355158 | A1 | * | 12/2015 | Lander | G01N 33/383 |
| | | | | | 702/2 |
| 2015/0369718 | A1 | * | 12/2015 | Chertov | G01N 33/24 |
| | | | | | 73/38 |
| 2017/0038782 | A1 | * | 2/2017 | Lucas | G05F 1/10 |
| 2019/0226970 | A1 | * | 7/2019 | Dusterhoft | E21B 43/26 |

OTHER PUBLICATIONS

Ingle, "The Functional and Design of Mass Air Flow Sensors," Aug. 30, 2019, AZO Sensors, downloaded from https://www.azosensors.com/article.aspx?ArticleID=1746 on Jul. 27, 2022 (Year: 2019).*

EngineeringClicks, "Laminar Flow," Feb. 27, 2020, downloaded from https://www.engineeringclicks.com/laminar-flow/ on Jul. 31, 2022 (Year: 2020).*

R.H. Gee, et al., "In-situ monitoring of flow-permeable surface area of high explosive powder using small sample masses," Nov. 5, 2014, LLNL-JRNL-663729, downloaded from https://www.osti.gov/pages/servlets/purl/1266674 on Aug. 2, 2022 (Year: 2014).*

Jack Dvorkin, "Kozeny-Carman Equation Revisited," 2009, downloaded from https://pangea.stanford.edu/~jack/KC_2009_JD.pdf on Jul. 27, 2022 (Year: 2009).*

Micromeritics Sub-Sieve AutoSizer II, Air-Permeability Particle Size, downloaded from https://www.micromeritics.com/Repository/Files/MIC-SAS-II-2019_v2.pdf 2017 (Year: 2017).*

Espacenet machine translation of JPH0227534A, Ono Tetsuo et al., "Apparatus for Measuring Concentration and Particle Size of Powder" Nov. 9, 1990 (Year: 1990).*

P. C. Carman, "The determination of the specific surface of powders", *J. Soc. Chem. Ind. Trans.* 1938, 57, 225.

A. Maiti, T. Y. Han, F. Zaka, and R. H. Gee, "In-situ monitoring of flow-permeable surface area of high explosive powder using small sample masses", *Propell. Explos. Pyrot.* 40 (3) 419-425 (2015).

A. Maiti, T. Y. Olson, T. Y. Han, and R. H. Gee, "Long-term coarsening and function-time evolution of an initiator powder", *Propell. Explos. Pyrot..* 42, 1352 (2017).

T. Allen, "Particle Size Measurement," vol. 2, Chapman & Hall, London, UK, 5th Ed., 1997, 256 pp.

P. C. Carman, "Flow of gases through porous media," Butterworths Scientific Publications, London, UK, 1956, pp. 13-18.

* cited by examiner

Validation Study: Comparing particle sizes measured by the system10 ($d_{CK}$) and the water meniscus/iso-dchart (Fisher Scientific apparatus) ($d_{GS}$) for three different materials

| Sample # | Flow-rate ($cm^3/min$) | $d_{CK}$ (microns) | $d_{GS}$ (microns) |
|---|---|---|---|
| PETN | | | |
| 505 | 1.15 | 2.11 | 2.10 |
| 509 | 1.13 | 2.09 | 2.08 |
| 512 | 1.15 | 2.11 | 2.12 |
| 543 | 6.25 | 4.93 | 5.00 |
| 544 | 6.50 | 5.03 | 5.05 |
| 545 | 8.00 | 5.58 | 5.50 |
| Portland Cement | | | |
| 501 | 5.43 | 4.59 | 4.54 |
| 503 | 5.18 | 4.49 | 4.61 |
| 508 | 5.60 | 4.67 | 4.63 |
| 511 | 5.30 | 4.54 | 4.70 |
| 535 | 5.35 | 4.56 | 4.64 |
| Glass Beads | | | |
| 59 | 3.20 | 3.53 | 3.54 |
| 75 | 3.37 | 3.62 | 3.54 |
| 517 | 3.25 | 3.55 | 3.48 |
| 523 | 2.98 | 3.40 | 3.48 |
| 526 | 3.17 | 3.51 | 3.52 |

FIGURE 4

APPARATUS AND METHOD FOR MEASURING FLOW-PERMEABLE SURFACE AREA OF POROUS POWDERS USING VOLUME FLOW RATE

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to fluid flow measuring systems and methods, and more particularly to systems and methods for flow-permeable surface area of porous powders using volume flow rate.

BACKGROUND

The statements in this section merely provide background information related to the present disclosure and may not constitute prior art.

Diverse industries such as pharmaceuticals, cosmetics, paints, textiles, minerals, packaging, structural and building materials, and energetic materials (e.g., initiating powders), all require the need to measure and quantify the flow permeable surface area of porous components. This topic is known in the industry as "air permeametry," and may be defined broadly as the study of the flow of air through a porous medium. In one form the porous medium may be made up of particles. Particle diameter (dm), and ultimately specific surface area, can be determined from the resistance to a flowing fluid by a column of packed particles of random shape. The packed powder bed is ideally made up of many tubular passages or "capillaries" that provide a path for air flow. Permeametry may be used to determine particle-size changes over defined time-intervals. This can provide an insight into how the morphology of the material changes and how it influences the performance of a device or material, such as an explosive.

Commercially available permeametry apparatuses suffer from several important limitations, including: (1) the need to work with a fixed mass equivalent of 1 cm³ of solid material; (2) the need to re-compact the material to monitor aging effects (which can introduce unwanted errors in the derived results); and (3) a superfluous design that requires the use of a "reference plug", and for some older apparatuses, the need to actually visually monitor the water meniscus height, which can lead to significant inaccuracies.

THEORETICAL BACKGROUND

Determination of surface area of porous powder via permeametry is based on fundamental flow equations derived first derived by Kozeny J. Kozeny, Ueber kapillare Leitung des Wassers im Boden, *Wein. Akad. Wiss.* 1927, 136 (2a), 271 and subsequently refined by Carman P. C. Carman, The determination of the specific surface of powders, *J. Soc. Chem. Ind. Trans.* 1938, 57, 225 and P. C. Carman, Flow of gases through porous media, Butterworths Scientific Publications, London, U K, 1956, which are commonly referred to in the literature as the Carman-Kozeny equations. In the description below, we adopt a more modern treatise of these equations as described in Allen's book T. Allen, Particle Size Measurement, vol. 2, Chapman & Hall, London, UK, 5th Edition, 1997.

To begin the discussion, we start with a porous powder packed in a cylindrical geometry of length L and cross-sectional area A at a porosity level $\varepsilon$. If we create a pressure drop $\Delta p$ across this sample, then air flows through the sample with some average apparent flow speed $u_a$ given by $u_a=Q/A$, where Q is the volume rate of flow. If $u_a$ is small enough to ensure a lamellar flow (i.e., low Reynold's number and no turbulence), it is straightforward to derive the following equation (see Allen, just below eq. (1.9)):

$$u_a = \frac{1}{k_1} \frac{\varepsilon^3}{(1-\varepsilon)^2} \frac{V_s^2}{S^2} \frac{\Delta p}{2\eta L}. \qquad \text{Equation (1)}$$

where S is the total surface area of powder, $V_S=(1-\varepsilon)LA$ is the volume occupied by the solid powder, $\eta$ the dynamic viscosity of air, and $k_1$ is a "tortuosity factor" to account for the fact that air does not flow in straight lines, but rather in tortuous paths or winding "tunnels" through the porous powder.

Equation (1) leads to the following expression for the specific surface area (SSA), defined as the ratio S/M (where sample mass $M=\rho_s V_s$), which we refer to as the Carman-Kozeny (CK) equation:

$$SSA_{CK} = \frac{\varepsilon^3 A \Delta p}{(1-\varepsilon)^2 L k_0 k_1 \eta Q \rho_s^2} \qquad \text{Equation (2)}$$

In equation (2), $k_0$ is a "tunnel shape" factor ($k_0 \approx 2$ for tunnels with circular cross-sections) and $p_s$ is the mass-density of the solid powder (i.e., powder with zero porosity). Alternately, an effective "spherical diameter" ($d_{CK}$) of the sample, inversely proportional to SSA, can be defined as follows:

$$d_{CK} = \frac{6}{\rho_s * SSA} = 6\sqrt{\frac{(1-\varepsilon)^2 L k_0 k_1 \eta Q}{\varepsilon^3 A \Delta p}} \qquad \text{Equation (3)}$$

Below, we refer to both eqs. (2) and (3) as the "Carman-Kozeny" equation. Through numerous experiments, Carman found that the constant $k_0 k_1$ is approximately equal to 5. In the discussion below we refer to $k_0 k_1$ as the "tortuosity constant."

Fisher-Scientific Design—Gooden-Smith Equation

To use equation (2) (or (3)) one needs to measure the pressure drop ($\Delta p$) across the sample and the volume flow rate (Q) through the sample. Gooden and Smith avoided these measurements by introducing a reference plug of known flow resistance ($C_{ref}$) in series with the sample of porous powder. In this design, the total pressure drop (P) across the sample plus reference plug is fixed, and one measures the pressure drop across the reference plug (F) (which means that the pressure drop across the sample is $\Delta p=P-F$). Thus, one has $Q=C_{ref}F$ and eq. (3) reduces to the following:

$$d = c\sqrt{\frac{(1-\varepsilon)^2}{\varepsilon^3} \frac{L}{A}} \sqrt{\frac{F}{(P-F)}}, \text{ where} \qquad \text{Equation (4)}$$

$$c = 6\sqrt{k_0 k_1 \eta C_{ref}}.$$ Equation (5)

In order to standardize eq. (4) even further, Gooden and Smith recommended using a total mass $p_s$ of sample powder (such that the solid powder occupies exactly $V_0 = 1$ cm³ of volume). This simplifies eq. (4) to the following:

$$d_{GS} = c \frac{L}{(AL - V_0)^{3/2}} \sqrt{\frac{F}{(P-F)}},$$ Equation (6)

where, $V_0 = 1$ cm³, and c is the constant given by eq. (5). Eq. (6) will henceforth be referred to as the "Gooden-Smith" equation.

The original apparatus, as designed by Fisher scientific, is based on the Gooden-Smith equation (eq. (6)) where the constant c has a prior calibration based on spherical particles of known sizes. In this apparatus the tube diameter (and hence the cross-sectional area A) is fixed at $A_s = 1.267$ cm², the length L is adjusted according to the desired packing porosity ε, the total pressure drop is fixed at P=50 cm of water, and the pressure drop F across the reference plug is measured using a water meniscus height. In terms of the (known) powder porosity E and standard tube cross-section area $A_s$, eq. (6) can be re-expressed as:

$$d_{GS} = c \frac{1}{A_s} \sqrt{\frac{(1-\varepsilon)V_0}{\varepsilon^3}} \sqrt{\frac{F}{(P-F)}},$$ Equation (6')

Fisher scientific provides an iso-diameter graphical chart, created using eq. (6'), which can be used to read $d_{GS}$ directly from the water meniscus height at a known porosity ε.

A More Modern Design

The "Standard Fisher" design described in the previous section suffers from the drawbacks discussed above. To summarize, these drawbacks are: the need to work with a fixed mass (equivalent of 1 cm³ of solid material), the need to re-compact the material to monitor aging effects, the need for a reference plug, and the need to visually monitor the water meniscus height.

Although it is not difficult to extend eq. (6) or (6') to arbitrary sample mass and sample-holder dimensions (see, e.g., A. Maiti, T. Y. Han, F. Zaka, and R. H. Gee, In-situ monitoring of flow-permeable surface area of high explosive powder using small sample masses, Propell. Explos. Pyrot. 40 (3) 419-425 (2015), A. Maiti, T. Y. Olson, T. Y. Han, and R. H. Gee, Long-term coarsening and function-time evolution of an initiator powder, *Propell. Explos. Pyrot.* 42, 1352 (2017)), the use of calibration graphical charts can hide important details, e.g., particle shapes and sizes for which the reference plug resistance has been calibrated to. Also, when using small sample masses, even small errors in the measured pressure drop F can introduce significant errors.

During work on the system of the present disclosure, the co-inventors set forth several important design objectives: (1) use a sample-holder, typically much smaller than the one used with the Fisher scientific (or Micromeretics) design, so that much smaller sample masses can be accommodated; (2) removal of the reference plug so that the whole pressure drop P is across the sample; and (3) use of a Low Flow Mass Flow Controller to accurately measure the volume flow rate Q through the sample and directly use the Carman-Kozeny equation (eq. (2) or (3)) to back out the specific surface area (or the equivalent spherical diameter).

Thus, it will be appreciated that present day, commercially available permeametry apparatuses suffer from one or more significant drawbacks. These drawbacks may be summarized as including at least one of: (1) the need to work with a fixed mass equivalent of 1 cm³ of solid material; (2) the need to re-compact the material to monitor aging effects (which can introduce unwanted errors in the derived measured SSA); and/or (3) a design that involves the need for use of a reference plug or flow. Also, in some instances, prior developed apparatuses also require visual monitoring/measurement of the water meniscus height, which can lead to inaccuracies in measurements.

Accordingly, there exists the need for an apparatus which is able to work with significantly smaller sample masses than previously developed flow measuring systems, and which enables in-situ characterization of age-related changes with no need for sample re-compaction, and the ability to obtain even higher accuracy SSA over a wider range of particle sizes and operating temperatures.

SUMMARY

This section provides a general summary of the disclosure and is not a comprehensive disclosure of its full scope or all of its features.

In one aspect the present disclosure relates to a system for determining particle size of a quantity of a sample material contained in a sample material holder, where the sample material is made up a plurality of the particles. The system may comprise a pressure regulating subsystem for receiving a first pressurized airflow signal and regulating the first pressurized airflow signal to a second pressurized airflow signal having a pressure lower than the first pressurized airflow signal, the second pressurized airflow signal configured to be input to a first end of the sample material holder. A mass airflow transducer may be included for determining a flow rate representing an air flow value entering the sample material holder. A control module may be included for using the air flow value in combination with the pressure differential value and mathematically determining a dimension of the particles making up the sample material.

In another aspect the present disclosure relates to a system for determining particle size of a quantity of a sample material contained in a sample material holder, where the sample material is made up a plurality of the particles. The system may comprise an enclosure and a pressure regulating subsystem contained within the enclosure for receiving a first pressurized airflow signal and regulating the first pressurized airflow signal to a second pressurized airflow signal. The second pressurized airflow signal has a pressure lower than the first pressurized airflow signal. The second pressurized airflow signal is configured to be input to a first end of the sample material holder. A pressure transducer may be included for determining a pressure differential between the second pressurized airflow signal entering the sample material holder and a third pressurized airflow signal exiting the sample material holder. The system may also include a computer and a control/user interface (UI) software operably associated with the computer. At least one mass airflow transducer may be included for measuring at least one of the second or third pressurized airflow signals and obtaining a mass airflow value representative thereof. A control module may be included for communicating with the pressure switch and proportioning air valve to control air flow downstream. The control module is operable to further receive voltage signals from the pressure transducer, mass airflow transducer, and mass airflow sensor. The control module is configured to interface with the computer and to send the values associated with the voltage signals for use by the control/UI software. The system may also comprise a device containing the control/UI software for using both the mass airflow value and pressure differential values associated with airflow through the sample material, and mathematically determining a dimension of the particles making up the sample material.

In still another aspect the present disclosure relates to a method for determining particle size of a quantity of a sample material contained in a sample material holder, where the sample material is made up a plurality of the particles. The method may comprise receiving a first pressurized airflow at a first pressure level from an external air source, and regulating the pressurized airflow signal down to a second pressure level less than the first pressure level, to create a second pressurized airflow. The method may further include directing the second pressurized airflow into a first end of the sample material holder and receiving a third pressurized airflow leaving the sample material holder. The method may further include determining a pressure differential between the second and third pressurized airflows, and measuring mass flow rate entering and exiting the sample material holder. The method may further include using the pressure differential in conjunction with the mass flow rate to determine a dimension of the particles making up the sample material.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings, in which:

FIG. 4 is a chart labelled "Table 1" showing validation studies performed by the co-inventors of the system of the present disclosure which compares particle sizes measured by air flow and the water meniscus for three different materials;

DETAILED DESCRIPTION

Example embodiments will now be described more fully with reference to the accompanying drawings.

The present disclosure, in one embodiment, broadly relates to a system which measures volume flow rate of air under a constant pressure drop. This obviates the need for use of a reference plug or for dual pressure transducers, which are typically required by previous flow measuring apparatuses. The various embodiments of the system of the present disclosure achieve accuracy levels at least comparable to, or even exceeding, previously developed flow measuring devices, while having a construction of reduced complexity and cost. In particular, the various embodiments discussed below provide significant advantages and beneficial structural design features, such as: (1) the use a sample-holder, typically much smaller than the one used with the prior art systems, so that significantly smaller sample masses can be accommodated; (2) elimination of the reference plug so that the whole pressure drop P is across the sample; (3) the use of a Low Flow Mass Flow Controller to accurately measure the volume flow rate Q through the sample and directly use the Carman-Kozeny equation (eq. (2) or (3)) to back out the specific surface area (or the equivalent spherical diameter).

In particular, the various embodiments of the present disclosure provide several advantages over pre-existing flow measuring devices including: (1) ease of use with automated electronic data reporting capability; (2) the ability to work with significantly smaller sample masses as compared to the current commercially available apparatuses; (3) flexible sample geometries, which enable in-situ characterization of age-related changes with no need for sample re-compaction; and (4) the possibility to attain even higher accuracy SSA over a wider range of particle sizes.

Figure 1:
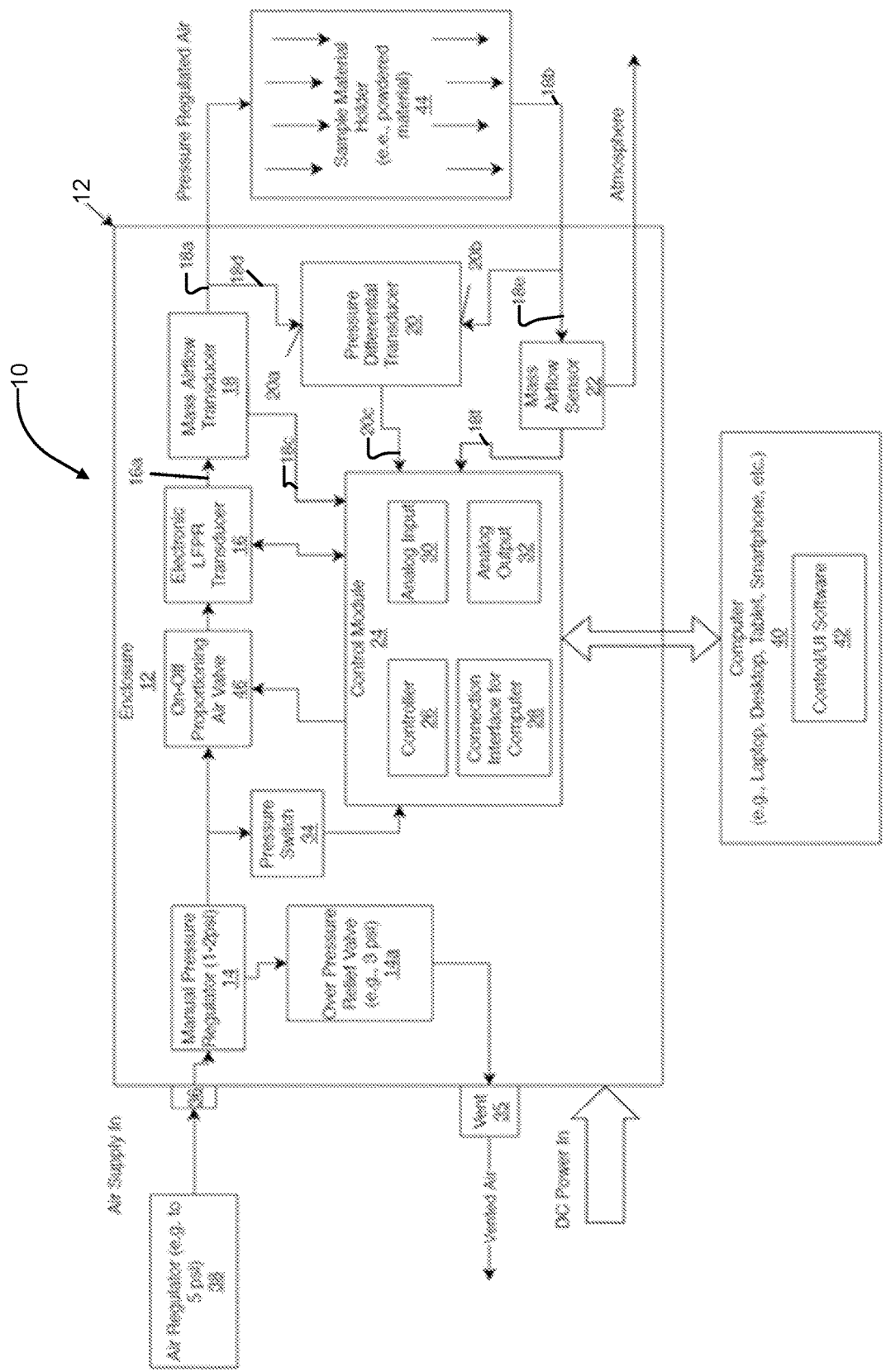
FIG. 1 is a high-level block diagram of one embodiment of a system 10 in accordance with the present disclosure.

Referring to FIG. 1, one embodiment of a flow measuring system 10 is shown for measuring a flow-permeable area of porous powders using volume flow rate. In this example the flow measuring system 10 (hereinafter simply "system 10") includes an enclosure 12 which forms a housing for the various components of the system. The enclosure 12 in this example houses a manual pressure regulator 14 and over pressure relief valve 14a, a pressure switch 34, an on-off proportioning air valve 46, an electronic low flow pressure regulator ("LFPR") transducer 16, a mass airflow transducer 18, a pressure differential transducer 20, and a mass airflow sensor 22.

The system 10 also includes a control module 24. The control module includes a controller 26, an analog input module 30, an analog output module 32, and a connection interface to communicate with a computer 40 and the Control/UI Software 42. In one embodiment the control module 24 is formed by a NI-Compac DAQ, controller 26, connection interface to computer 28, and analog input 30 and output 32 modules. An air connection port 36 allows pressurized air to be received by the enclosure 12 and specifically by the manual pressure regulator 14 and by the pressure switch 34. An air regulator 38 is coupled to the air connection port 36 of the enclosure 12 to reduce the incoming air pressure to a significantly lower pressure (e.g., 5 psi) before entering the system 10. A vent port 35 allows excess pressurized air to be vented out of the enclosure if the air pressure entering the system 10 reaches a level that can be harmful to the hardware within the enclosure 12.

The system 10 further is preferably coupled to an external computer 40, which may comprise any type of computing equipment (e.g., laptop, desktop, tablet, smartphone, personal digital assistant, etc.). In one implementation the system 10 does include the computer 40. In still another embodiment the system 10 may include a suitable computer 40 which is incorporated within the enclosure 12 to form a fully integrated, self-supported system. In that embodiment, it would be preferable to also include a suitable display system (e.g., LCD, LED, CRT, etc.). All of the above implementations are contemplated by the present enclosure.

In any of the above implementations, the computer 40 may be loaded with suitable control/UI (user interface) software (e.g., National Instruments™ LabVIEW software) to enable the user to control the system 10 and to enter variables needed to carry out measurements on the sample material. The computer 40 may also be loaded with an executable file created by the co-inventors that does not require the purchase of a software license. The computer 40 may include a suitable display (not shown) that shows various fields of the control/UI software that the user may enter information or data into, for example a unique identifier such as sample number, mass, material, density and/or porosity of the sample material being measured. Export features of the control/UI software may provide the user with output information such as the flow, pressure data and/or particle diameter of the powdered sample material based on the above referenced CK equation, which can then be saved to a file on the computer 40 and analyzed with the user's software of choice (e.g., Microsoft Excel).

The system 10 is also coupled via an air supply line 18a and an air return line 18b to an external sample material holder 44. In one embodiment the sample material holder 44 thus does not form an integral portion of the system 10, but rather the system 10 is simply connectable to the sample material holder to supply a highly regulated airflow into the sample material holder 44. The material sample holder 44 is designed to be releasably attached to the enclosure 12 with suitable connections for the air supply and return lines 18a and 18b, respectively. This allows for the use of multiple sample material holders 44 that can be prepared beforehand or contain different internals for a variety of sample shapes and configurations. The sample material holder 44 typically holds a quantity of powdered material, which may in some instances be compacted powdered material.

In operation the enclosure 12 receives an airflow signal, in this example an approximate 5 psi, which may be viewed as a "first pressurized airflow signal", at an input of the manual air inlet pressure regulator. The manual air inlet pressure regulator provides a highly regulated and precise regulated airflow at its output, which in one example is between 1 psi-2 psi. The air then flows to a pressure switch 34 that sends a signal to the Control Module 24 when the pressure reaches a certain level (e.g., 1 psi). Once this signal is received, a control signal is sent to the Proportioning Air Valve 46 to open and allow air to continue flow. This output is then fed to the electronic LFPR transducer 16 which provides an even more finely regulated airflow output, for example 50 grams/cm2, on circuit line 16a. This output may be viewed as a "second pressurized airflow signal". The output on circuit line 16a is then fed into the mass airflow transducer 18 which measures a total mass airflow flowing on air supply line 18a into the sample material contained in the sample material holder 44. A proportional electrical signal, representative of the total mass airflow on air supply line 18a, may be fed from an output of the mass airflow transducer 18 via circuit line 18c, back to the control module 24. This precisely controlled air flow signal is continuously monitored by the Control/UI Software 42 and converted into a flow rate to be used in the CK equation. The quantity of airflow leaving the sample material holder 44 via the discharge airflow line 18b may be viewed as a "third pressurized airflow signal," this line will be at atmospheric pressure, and is supplied via the discharge airflow line 18b to the mass airflow sensor 22. The output of this sensor is used as a validation of the mass airflow transducer to ensure no unsuspected changes in the flow rate of the system 10.

A small portion of the second pressurized airflow signal on circuit line 18a entering the sample material holder 44 is directed via a circuit line 18d to one input 20a of the pressure differential transducer 20. Similarly, a small portion of the third pressurized airflow signal at the output side of the sample material holder 44 (i.e., on circuit line 18b) is similarly directed into a second input 20b of the pressure differential transducer 20 via a circuit line 18e. This enables the pressure differential transducer 20 to provide an electrical signal in accordance with the sensed pressure differential across the input and output sides of the sample material holder 44. The electrical signal from the pressure differential transducer 20 is provided via an output 20c to the control module 24, and the control/UI software 42 can record this value, which represents a highly accurate assessment of the pressure differential drop (Δp) across the powdered material in the sample material holder 44. The control/UI software converts the voltage signal provided by the control module 24 and converts it to a pressure value. This pressure value is displayed to the user to be continuously monitored for any changes in pressure, indicative of an issue occurring somewhere in the system 10. The pressure differential drop is also fed into the CK equation but shall remain a relatively constant value.

Accordingly, the control module 24 monitors, in real time, the total mass airflow entering the sample material holder 44 and flowing through the sample material, and the total mass airflow leaving the sample material holder. The use of a mass airflow transducer 18 and a mass airflow sensor 22 enables the system 10 to ensure that the airflow entering the sample material holder 44 equals the total mass airflow leaving the sample material holder, to thus ensure the accuracy of the measured airflow being used to determine the particle size. This also serves as a check to ensure no issues (e.g., leaks, clogs) are occurring within the system 10. Overall, the mass airflow sensor 22 acts as a check to the mass airflow transducer 18 to ensure accurate determination of the volume flow-rate Q. The mass airflow sensor 22 often utilizes a transfer function to obtain the flow rate across the device:

$$F_A = 2.5 F_{FS}(V_O/V_S - 0.5)$$

where $F_A$ is flow across the device, $F_{FS}$ the full scale flow specified for the device, and $V_O$ and $V_S$ are the output voltage of device and the supply voltage, respectively.

Figure 3:
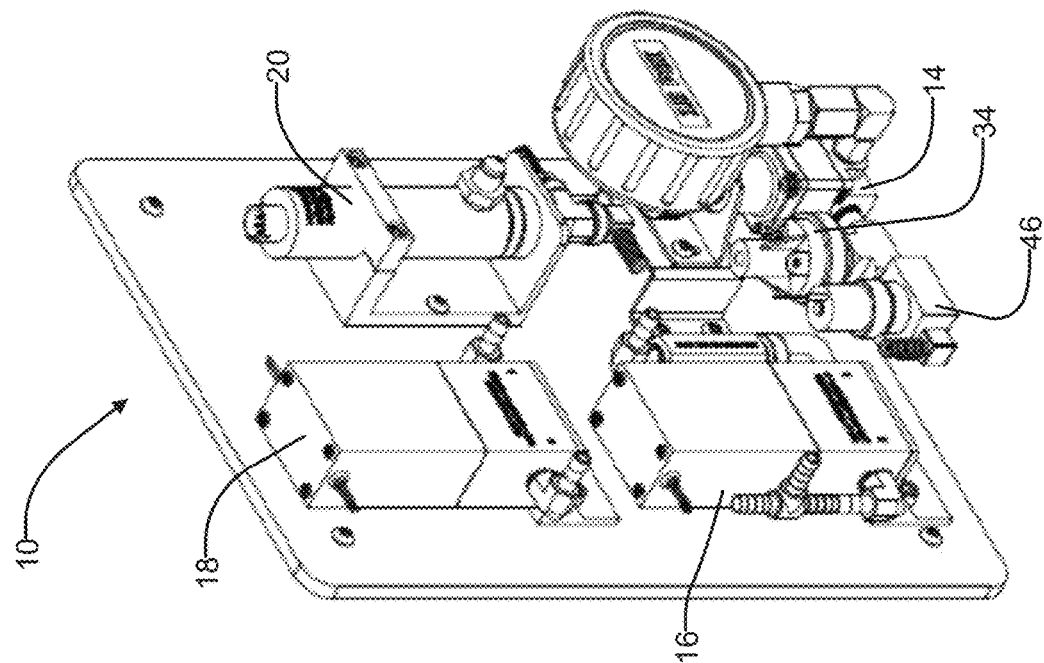
FIG. 3 is a perspective view of the components and layout shown in FIG. 2.
Figure 2:
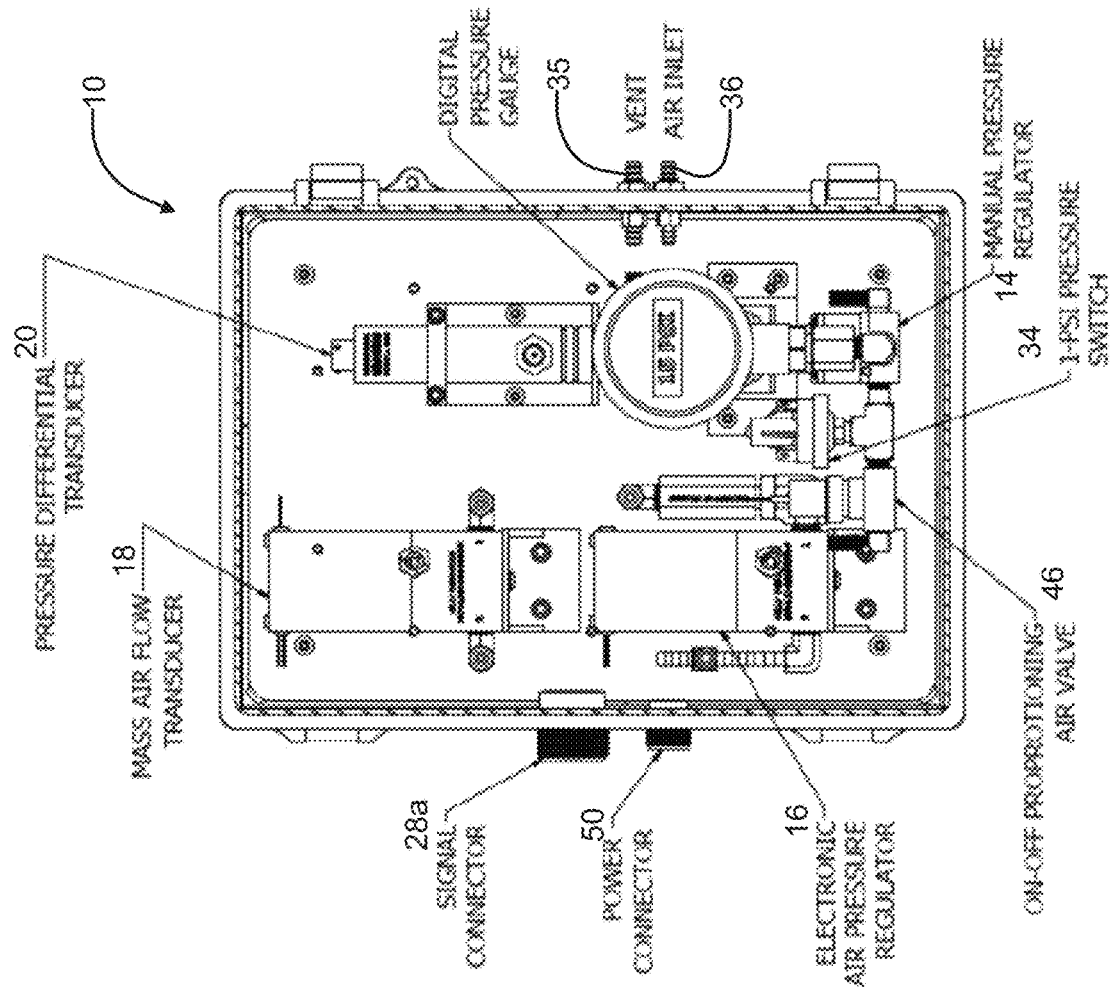
FIG. 2 is a front view of one embodiment of the physical components and physical layout of the system of FIG. 1.

FIGS. 2 and 3 show representative illustrations of the physical components of the system 10. A signal connector 28a may be coupled to the control module 24 to enable communication with the system 10. A power connector 50 may be included for connecting electrical power (e.g., DC power) to the system 10. In one implementation control module 24 may be selected to as National Instruments™ cDAQ Compact Ethernet Chassis. This component has a multi-slot backplane which can accommodate up to four I/O modules. This chassis forms a particularly preferable solution for implementing the present system 10 because it is designed for distributed sensor measurement systems that control timing, synchronization and data transfer between C Series I/O modules and an external host computer (e.g., computer 40 in FIG. 1) supporting suitable software (e.g., National Instruments™ LabVIEW software).

Validation

As a basic validation study, the co-inventors created a cylindrical sample holder of dimensions length L=3.71 mm and diameter d=6.35 mm. Powders of different SSA, plus nearly-mono-dispersed Portland Cement and Glass bead samples of known spherical particle sizes were packed into this tube at a constant porosity level of 0.468. Such dimensions and porosity ensures that the Gooden-Smith equation can be used in its unaltered form, and thus the particle size (dGS) can be read directly from reading the water meniscus height against the iso-diameter graphical chart provided by Fisher scientific. For each powder the co-inventors also measured the air flow and determined the Carman-Kozeny diameter (d) using eq. (3). In the table shown in FIG. 4, these results are compared for 16 different samples, using a tortuosity constant k0k1=5.32. This value is consistent with values around −5 determined by Carman on a large number of studies for particles in the size range considered here.

Figure 5:
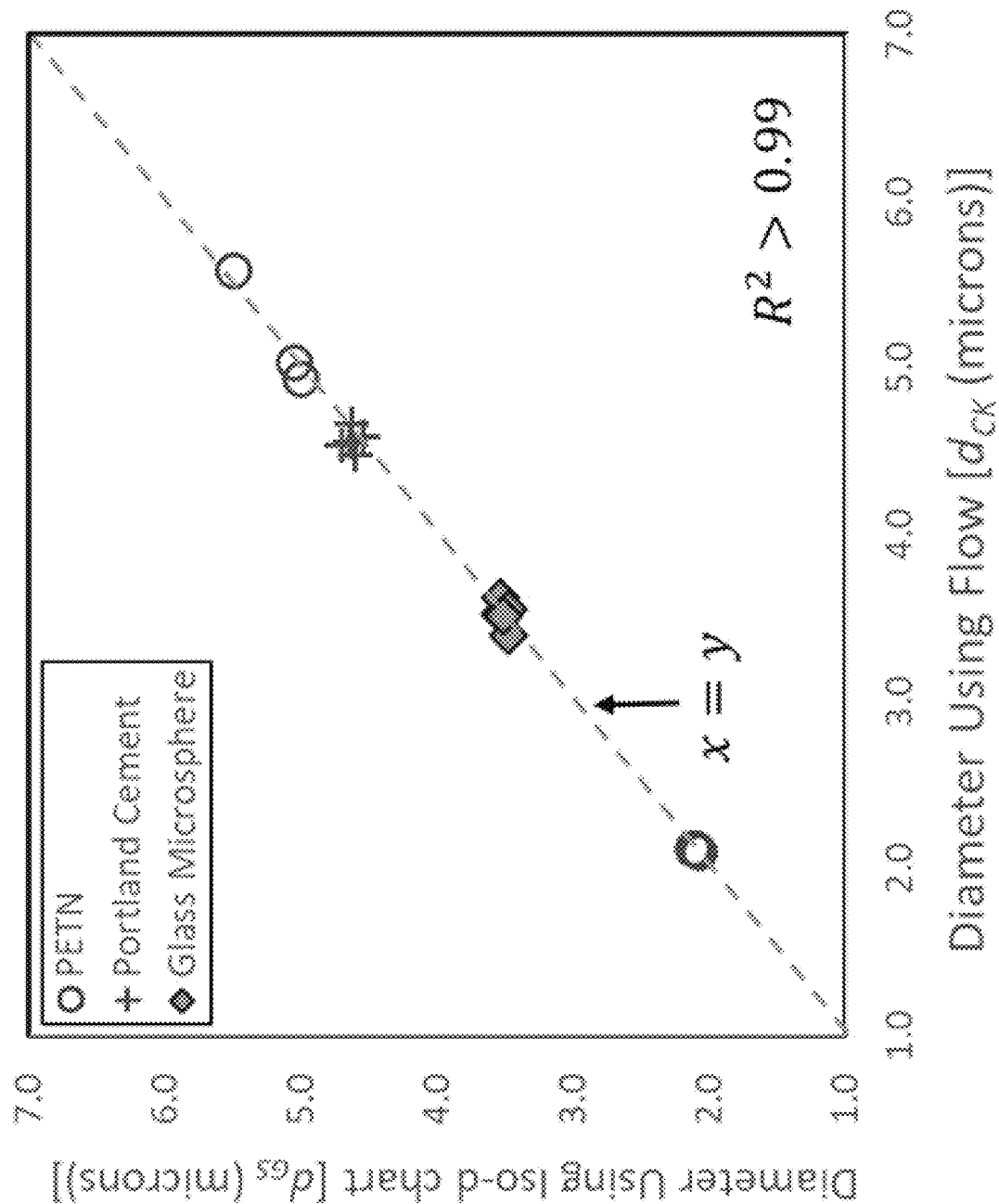
FIG. 5 is a graph further illustrating the test results of FIG. 4.

FIG. 5 graphically displays the results of the table shown in Table 1 (presented in FIG. 4). The results from the system 10 are in excellent agreement with those obtained by the standard Fisher apparatus. FIG. 5 also illustrates that the results agree for several different materials using the same tortuosity constant.

Figure 6:
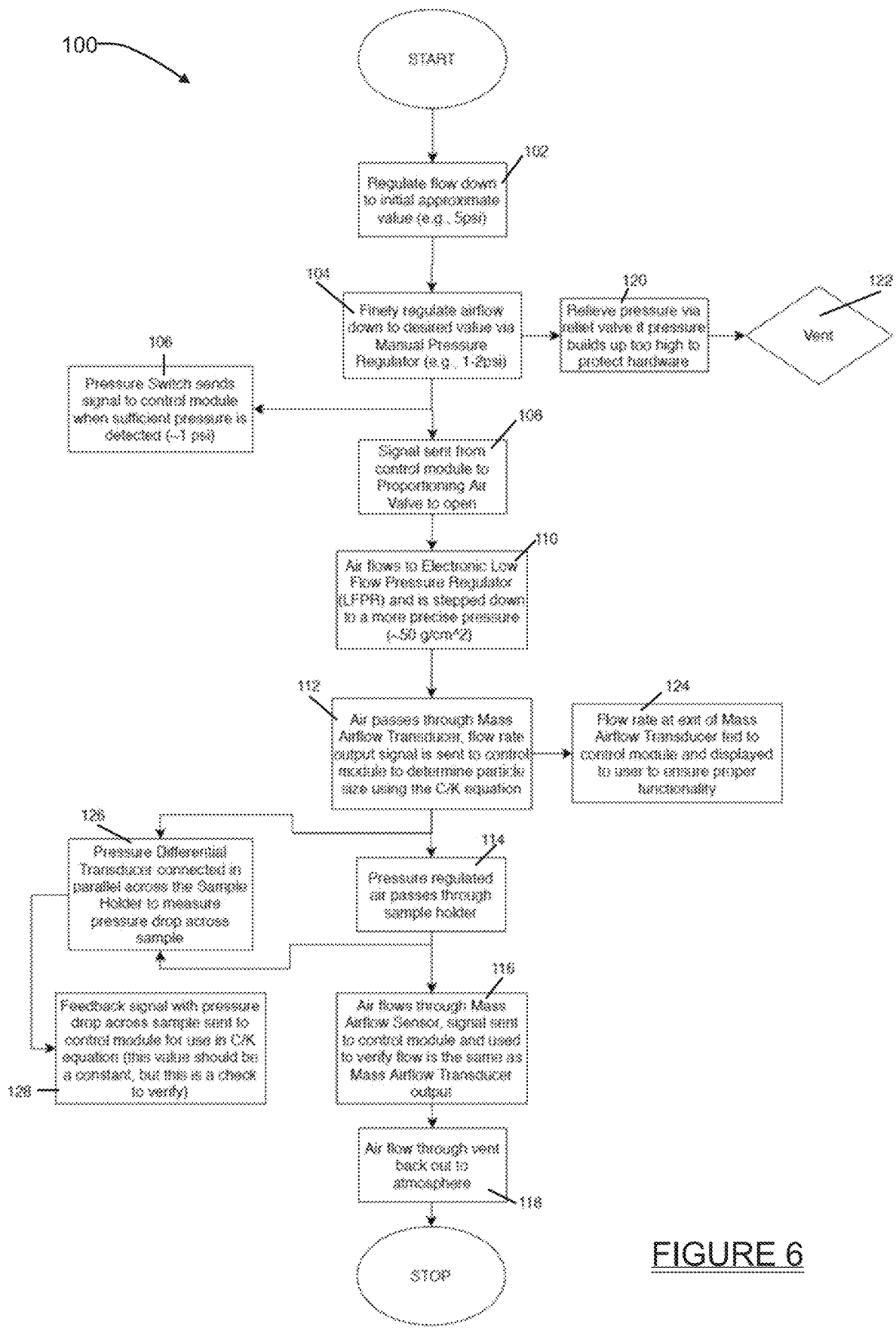
FIG. 6 is a high-level flowchart summarizing the principle flow path and major operations that the system of FIG. 1 may perform during operation.

FIG. 6 shows a flowchart 100 summarizing high level operations that may be performed by system 10. At operation 102 the incoming airflow into the system 10 is initially regulated down to a more controlled level (e.g., 5 psi). At operation 104 the pressure is more finely regulated by the manual pressure regulator, for example 1 psi-2 psi. Operation 120 occurs in the event the pressure builds up to an unsafe level in which the high-pressure relief valve lets out the excess pressure through a vent indicated by operation 122. At operation 106 the pressure switch 34 sends a signal to the control module 24 when sufficient pressure is present in the air line. A signal is sent out from control module 24 to the proportioning air valve 46 signaling it to open in operation 108. At operation 110 the airflow is again regulated down to a final level, for example 50 g/cm2, by the electronic LFPR transducer 16. Air then passes through to the mass airflow sensor in operation 112 where the flow rate is precisely measured at the output. This output signal is sent to the control module 24 for use in the CK equation in operation 124. The finely regulated and precisely measured air passes through the sample holder in operation 114. Pressure differential transducer is connected in parallel across the sample holder and measures the pressure drop in operation 126. This pressure drop value is sent as a voltage signal to the control module 24 at operation 128. From the sample material holder 44 the air moves on to the mass airflow sensor 22 in operation 116 where the flow rate is measured again and sent to the control module 24 for verification. Finally, air flows back out to atmosphere with operation 118, thus completing the flow path.

The system 10 design has several advantages relative to previously developed systems. For one, the system 10 is capable of being operated with significantly smaller sample masses. This is especially advantageous when dealing with expensive or explosives materials, where the use of a minimal amount of sample material is highly desirable.

Another important advantage is that the system 10 is capable of in-situ monitoring of aging effects without the need for powder re-compaction. Moreover, the design of the system 10 is such that it does not require any liquid (water) columns, and is equipped with suitable components for convenient and easy electronic reading/writing for I/O. The system 10 is also able to operate directly in accordance with the fundamental Carman-Kozeny equation, which can more accurately accommodate changing measurement conditions, such as measurement temperatures different from ambient, which can alter the flow viscosity of air. Still further, the system 10 is amenable to calibration for a wider range of particle shapes and sizes (e.g., through a more rational calibration of the tortuosity constant).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A water free system for determining particle size of a quantity of a sample material, without the need for use of a reference plug, and which is contained in a sample material holder having an airflow input port and an airflow output port both in communication with the sample material, where the sample material is made up a plurality of the particles, the system comprising:
    a pressure regulating subsystem for receiving a first pressurized airflow signal and regulating the first pressurized airflow signal to a second pressurized airflow signal having a pressure lower than the first pressurized airflow signal, the second pressurized airflow signal configured to be input to the airflow input port of the sample material holder;
    a mass airflow transducer having an output and configured to sense an airflow rate representing an airflow value in accordance with the second pressurized airflow signal entering the sample material holder through the airflow input port, and to generate a first electrical output signal in accordance therewith;
    a single pressure differential transducer having a first input and a second input, with the first input receiving the second pressurized airflow signal and being coupled in parallel at the output of the mass airflow transducer and the airflow input port of the sample material holder, and the second input being in communication with a third pressurized airflow signal exiting the airflow output port of the sample material holder, the third pressurized airflow signal being generated without modifying a height or porosity of the quantity of sample material;
    the pressure differential transducer configured to provide a second electrical output signal representing an airflow pressure differential between the second and third pressurized airflow signals; and
    a control module including a controller, the control module configured to use both:
        the first electrical output signal from the mass airflow transducer, representing the second pressurized airflow signal entering the sample material holder; and
        the second electrical output signal from the pressure differential transducer based on the airflow pressure differential created by the quantity of sample material contained in the sample material holder;
        to determine a dimension of the particles making up the sample material; and
    control/UI software in communication with the controller and configured to run in an external computer having a display, the control/UI software configured to convert a real time output signal from the control module to a corresponding real time pressure value, and to present pressure value information continuously to the display of the external computer in real time to enable continuous real time monitoring by a user to changes in pressure experienced within the sample material holder.

2. The system of claim 1, further comprising a mass airflow sensor in communication with the airflow output port of the sample material holder for sensing a total mass airflow associated with the third pressurized airflow signal.

3. The system of claim 2, further comprising an enclosure, the enclosure forming a housing for containing the pressure regulator subsystem, the pressure differential transducer and the control module.

4. The system of claim 3, wherein the housing further contains the mass airflow transducer and the mass airflow sensor, and wherein the mass airflow transducer measures the airflow rate into the sample material holder and the mass airflow sensor measures the total mass airflow leaving the sample material holder.

5. The system of claim 1, wherein the pressure regulating subsystem includes a manual pressure regulator for receiving the first pressurized airflow signal and regulating the first pressurized airflow signal down to a lesser pressure level.

6. The system of claim 5, wherein the pressure regulating subsystem additionally includes a pressure switch to check the presence of sufficient pressure in the system and a proportioning air valve to protect downstream components that is sent a signal to open when one is received from the pressure switch.

7. The system of claim 5, wherein the control module includes a controller and an Input/Output (I/O) subsystem in communication with the controller.

8. The system of claim 7, wherein the control module contains an interface that establishes a connection with the external computer having the control/UI software, for communication between the control module and the control/UI software.

9. The system of claim 8, wherein the control module further comprises an analog output and an analog input.

10. The system of claim 1, wherein the system further includes control/UI software, and wherein the control/UI software is configured to use the following equations in mathematically determining the dimension of the particles making up the sample material:

$$u_a = \frac{1}{k_1} \frac{\varepsilon^3}{(1-\varepsilon)^2} \frac{V_s^2}{s^2} \frac{\Delta p}{2\eta L} \quad \text{Equation (1)}$$

wherein the particles are a porous powder packed into a solid powder having a cylindrical geometry of length L and cross-sectional area A at a porosity level $\varepsilon$, and wherein the pressure differential is represented by pressure drop $\Delta p$ across the sample material, then air flows through the sample with an average apparent flow speed $u_a$ given by=Q/A, where Q is a volume rate of flow; and wherein $u_a$ is small enough to ensure a laminar flow where S is a total surface area of powder, $V_S$=(1−$\varepsilon$)LA is a volume occupied by the solid powder, $\eta$ a dynamic viscosity of air, and $k_1$ is a tortuosity factor;

Eq. (1) for a specific surface area (SSA), defined as a ratio SIM (where sample mass M=$\mu_S V_S$), which is defined as a Carman-Kozeny (CK) equation:

$$SSA_{CK} = \frac{\varepsilon^3 A \Delta p}{(1-\varepsilon)^2 L k_0 k_1 \eta Q \rho_s^2}$$ Equation (2)

and wherein In eq. (2), $k_0$ is a "tunnel shape" factor, and wherein $\rho_S$ is a mass-density of the solid powder with zero porosity, and wherein a "spherical diameter" ($d_{CK}$) of the sample, inversely proportional to SSA, is defined as follows:

$$d_{CK} = \frac{6}{\rho_s * SSA} = 6\sqrt{\frac{(1-\varepsilon)^2 L k_0 k_1 \eta Q}{\varepsilon^3 A \Delta p}}$$ Equation (3)

11. A water free system for determining particle size of a quantity of a sample material, without the need for use of a reference plug, and which is contained in a sample material holder, where the sample material holder has a first end forming an input and a second end forming an output, and where the sample material is made up a plurality of the particles, the system comprising:

an enclosure;

a pressure regulating subsystem contained within the enclosure for receiving a first pressurized airflow signal and regulating the first pressurized airflow signal to a second pressurized airflow signal having a pressure lower than the first pressurized airflow signal, the second pressurized airflow signal configured to be input to the first end of the sample material holder;

a single pressure differential transducer having first and second inputs coupled across the first and second ends, respectively, of the material holder, and configured to determine a pressure differential between the second pressurized airflow signal entering the first end of the sample material holder and a third pressurized airflow signal exiting the second end of the sample material holder, the third pressurized airflow signal being generated without modifying a height or porosity of the quantity of sample material;

a computer;

control/user interface (UI) software operably associated with the computer;

a mass airflow transducer having an input and an output, and configured to measure the second pressurized airflow signal and obtaining a first mass airflow value representative thereof, the first input of the pressure differential transducer further being coupled in parallel at the output of the mass airflow transducer and in parallel at the input of the sample material holder;

a mass airflow sensor having a mass airflow signal input for measuring the third pressurized airflow signal and obtaining a second mass airflow value representative thereof, and the second input of the pressure differential transducer further being in parallel communication with the output of the sample material holder and the mass airflow signal input;

a control module for communicating with the mass airflow transducer, the mass airflow sensor, the pressure switch and proportioning air valve to control air flow;

the control module further receiving voltage signals from the pressure differential transducer, the mass airflow transducer and the mass airflow sensor;

the control module further interfacing with the computer and sending values associated with the voltage signals for use by the control/user interface (UI) software;

a device containing the control/user interface (UI) software for using both the mass airflow value and pressure differential value associated with airflow through the sample material, and mathematically determining a dimension of the particles making up the sample material; and the control/UI software further being configured to run in the computer, and wherein the computer includes a display, the control/UI software configured to convert the values associated with voltage signals received from the control module into corresponding pressure value information, and to present the pressure value information continuously to the display of the computer in real time to enable continuous real time monitoring by a user to changes in pressure experienced within the sample material holder.

12. The system of claim 11, wherein the pressure regulating subsystem includes a manual air inlet pressure regulator switch, settable to a pressurized air level of between 1 psi-2 psi.

13. The system of claim 12, wherein the pressure regulating subsystem further includes an electronic low flow pressure regulating transducer responsive to an output from the manual air inlet pressure regulator switch, for using the 1 psi-2 psi pressurized air level to create the second pressurized airflow signal.

14. The system of claim 13, wherein the second pressurized airflow signal comprises a 50 g/cm² airflow output entering the sample material holder.

15. The system of claim 11, wherein the control module further includes:

an Input/Output (I/O) subsystem in communication with the controller;

a connection interface allowing communication with hardware containing control/UI software;

an analog input; and an analog output.

16. The system of claim 11, wherein the control/user interface (UI) software is configured to use the following equations in mathematically determining the dimension of the particles making up the sample material:

$$u_a = \frac{1}{k_1} \frac{\varepsilon^3}{(1-\varepsilon)^2} \frac{V_s^2}{s^2} \frac{\Delta p}{2\eta L}$$ Equation (1)

wherein the particles are a porous powder packed into a solid powder having a cylindrical geometry of length L and cross-sectional area A at a porosity level $\varepsilon$, and wherein the pressure differential is represented by pressure drop $\Delta p$ across the sample material, then air flows through the sample with an average apparent flow speed $u_a$ given by=Q/A, where Q is a volume rate of flow; and wherein $u_a$ is small enough to ensure a laminar flow where S is a total surface area of powder, $V_S=(1-\varepsilon)LA$ is the volume occupied by the solid powder, $\eta$ a dynamic viscosity of air, and $k_1$ is a tortuosity factor;

Eq. (1) for a specific surface area (SSA), defined as a ratio S/M (where sample material mass $M=\mu_S V_S$), which is defined as a Carman-Kozeny (CK) equation:

$$SSA_{CK} = \frac{\varepsilon^3 A \Delta p}{(1-\varepsilon)^2 L k_0 k_1 \eta Q \rho_s^2}$$ Equation (2)

and wherein in eq. (2), $k_0$ is a "tunnel shape" factor, and wherein $\mu_S$ is a mass-density of the solid powder with zero porosity, and wherein a "spherical diameter" ($d_{CK}$) of the sample material, inversely proportional to SSA, is defined as follows:

$$d_{CK} = \frac{6}{\rho_s * SSA} = 6\sqrt{\frac{(1-\varepsilon)^2 L k_O k_1 \eta Q}{\varepsilon^3 A \Delta p}} \quad \text{Equation (3)}$$

17. A water free method for determining particle size of a quantity of a sample material, and which is contained in a sample material holder having an input end and an output end, where the sample material is made up a plurality of the particles, the method comprising:
- receiving a first pressurized airflow at a first pressure level from an external air source;
- regulating the pressurized airflow signal down to a second pressure level less than the first pressure level, to create a second pressurized airflow;
- using a mass airflow transducer having an input and an output, and configured to sense the second pressurized airflow and to provide a first signal in accordance therewith;
- directing the second pressurized airflow into the first end of the sample material holder to cause the second pressurized airflow to flow through the sample material;
- using a single pressure differential transducer having a first input parallel coupled at the input of the sample material holder and in communication with the input of the sample material holder, and coupled in parallel at the output of the mass airflow transducer, to receive the second pressurized airflow signal at the first input, and a second input coupled in parallel at the second end of the sample material holder and with the mass airflow sensor input, to receive a third pressurized airflow leaving the second end of the sample material holder, the third pressurized airflow signal being generated without modifying a height or porosity of the quantity of sample material;
- determining a pressure differential between the second and third pressurized airflows caused by the sample material;
- using a mass airflow sensor having a mass airflow sensor input to measure a first mass flow rate of the second pressurized airflow entering the first end of the sample material holder, wherein the mass airflow input is coupled in series with the output of the sample material holder;
- using the pressure differential caused by the material sample, in conjunction with the mass flow rate, to determine a dimension of the particles making up the sample material; and
- further using control/UI software in communication with the controller, and configured to run in an external computer having a display, to convert an output signal from the control module to corresponding pressure value information, and to present the pressure value information continuously to the display of the external computer in real time to enable continuous real time monitoring by a user to changes in pressure experienced within the sample material holder.

\* \* \* \* \*